Patented Dec. 26, 1950

2,535,831

UNITED STATES PATENT OFFICE 2,535,831

SYNTHESIS OF THIOETHERS

Richmond T. Bell, Highland Park, Ill., assignor to The Pure Oil Company, Chicago, Ill., a corporation of Ohio No Drawing. Application November 9, 1945, Serial No. 627,780

1 Claim. (Cl. 260—609)

This invention relates to the preparation of organic sulfides and saturated hydrocarbons and more particularly to the preparation of monosulfides or thioethers by reaction of mercaptans with unsaturated hydrocarbons.

An object of the invention is to synthesize organic sulfides from mercaptans and unsaturated hydrocarbons.

Another object of this invention is to provide a method for synthesizing organic mono-sulfides or thioethers from mercaptans and unsaturated hydrocarbons.

Still another object of the invention is to provide a method for synthesizing hydrocarbons containing a saturated open hydrocarbon chain and organic disulfides from mercaptans and unsaturated hydrocarbons.

Other objects of the invention will appear from the following description.

I have discovered that mercaptans will react with unsaturated hydrocarbons regardless whether they be straight-chain, branched-chain, or cyclic, in the presence of a Friedel-Crafts type catalyst to yield thioethers or a mixture of saturated hydrocarbons and organic disulfides depending chiefly on the reaction temperature, contact time, mol ratio of reactants, and mol ratio of catalyst to reactants. As examples of catalysts which are useful in my invention may be mentioned, the anhydrous halides of aluminum, boron, zirconium, beryllium, bismuth, tantalum, titanium, columbium, iron, copper, tin and antimony. The aforesaid halides may be used alone or in admixture with each other or in conjunction with the corresponding hydrogen halide. Complexes of the aforesaid halides with olefins and/or with mercaptans are also useful. The aforesaid compounds all have the ability to catalyze condensation reactions including but not limited to the original Friedel-Crafts reactions.

In connection with those elements which have two or more valences and which form two or more halides, when synthesizing thioethers, I prefer to use the halide in which the non-halide element exhibits its lowest valence, provided that said halide is at least equivalent in catalytic activity to halides in which the non-halide element exhibits higher valences. By using the halide in which the element exhibits the lower valence, oxidation of mercaptans to disulfides and halogenation of olefins is minimized. For example, in the case of antimony, iron, tin and copper, I prefer to use antimony trichloride, ferrous chloride, cuprous chloride and stannous chloride. In addition to the halides aforementioned, mixtures of phosphorus trifluoride and hydrogen fluoride or phosphorus trifluoride and boron trifluoride may be used as catalysts.

In the synthesis of disulfides, I prefer to use as catalysts halides in which the non-halide element exhibits its highest valence, provided the catalytic activity of the halide is substantially at least as good as the halides in which the non-halide element exhibits lower valence. The possibility of additional disulfide formation due to oxidation of mercaptans and the formation of hydrogen halide incident to mercaptan oxidation thereby promoting the activity of the halide catalyst, favor the use of the halides in which the non-halide element exhibits the highest valence, where the objective is the preparation of disulfides.

In order to secure catalysts with certain properties desired for special purposes, (1) a halide catalyst may be dissolved in another halide catalyst, for example solutions of alminum chloride in antimony trichloride; (2) a halide catalyst may be used to impregnate an adsorbent carrier, for example activated alumina, bauxite or carbon impregnated with aluminum chloride; (3) a halide catalyst may be fused with another inorganic halide either active or inert, for example a sodium chloride-aluminum chloride flux. The latter two solid types may be used to advantage in instances where it is desired to carry out the reaction in the vapor phase with no liquid phase present. In such cases the flux type is particularly suitable for higher temperatures. The use of small amounts of hydrogen halide as catalyst promoter when carrying out the reaction is in general advantageous for increasing catalytic activity or the length of active life of the catalyst.

Reaction may be carried out at temperatures ranging from approximately —35° C. to 200° C. with contact times ranging from approximately two minutes to twenty-four hours or more. In general, excellent yields are obtained when using contact times of approximately ten minutes to one hour. The reaction may be conducted under atmospheric, or superatmospheric pressure, and is preferably carried out with a liquid phase present. The liquid may consist of one or more separate phases and may include reactants, products, catalyst-complexes, solutions or slurries of catalyst or catalyst-complexes in inert solvents, or combinations of these.

The reaction conditions will vary with different catalysts. The more reactive catalysts, such as anhydrous aluminum chloride and boron trifluoride-hydrogen fluoride mixtures, require lower temperatures and shorter contact periods; whereas, the less reactive catalysts, such as cuprous chloride, require longer periods of time and higher temperatures to obtain good yields. In general, temperatures below 100° C. should be used in the preparation of thioethers, whereas in the preparation of disulfides and saturated hydrocarbons temperatures of 100 to 200° C. are more favorable. Under similar reaction conditions, in general longer contact times are required for substantial yields of saturated hydrocarbons and disulfides from the reactants. The quantity of catalyst used depends on the catalyst activity, the constitution of the reactants, reaction conditions, type of operation, and the main product desired, but with a liquid phase present, proportions of catalyst substantially less than molar with respect to either reactant, are usually employed where thioethers are desired as the chief product. Under similar reaction conditions, proportions of catalyst approaching molar are usually more favorable for the production of disulfides and saturated hydrocarbons.

The process may be carried out as a batch, semi-continuous or substantially continuous operation. If carried out as a batch operation, the mercaptans and olefins are contacted with each other in the presence of a catalyst with constant, vigorous agitation until the catalyst is substantially exhausted with respect to accelerating formation of the desired product. If carried out as a semi-continuous operation, unit charges of olefins and mercaptans are agitated with the catalyst for a selected period of time and then separated from the catalyst by decantation after which a second unit charge is added to the reaction vessel containing the partially spent catalyst and the process is repeated. In this manner of operation, the amount of olefin and mercaptan charged to the reaction vessel in each unit charge is insufficient to substantially exhaust the fresh catalyst and the catalyst will remain active for accelerating formation of the desired product from a number of consecutive unit charges. It has been found that by adding mercaptans and olefins to the catalyst in unit charges, the yield of thioethers per unit of catalyst is greater than when simple batch operation is practiced.

Where continuous type of operation is practiced, a series of reaction vessels is provided so that when the reaction in one vessel is completed the charge of olefins and mercaptans is switched to another reaction vessel while the reaction products are separated from the catalyst in the first reaction vessel and it is prepared for re-charging. A sufficient number of reaction vessels are provided so that charging of reactants may be continuous.

Another means of continuous operation consists of continuously charging the reactants to the lower part of a contactor, preferably at a point just above the interface of catalytic complex phase and upper liquid phase, and continuously taking off products at a point near the top of the contactor. The contactor is equipped with means for positive, controlled, vigorous stirring at either atmospheric or superatmospheric pressure, with means for heating or cooling the reaction mixture, and with baffles designed to reduce the amount of catalytic complex in suspension carried out of the top exit. The contactor is also equipped for continuously charging catalyst preferably at a point in the contactor immediately above the catalytic complex-upper liquid layer interface, and has an exit line from the bottom for continuous withdrawal of spent catalytic complex phase. The upper liquid layer discharges from near the top of the contactor into the top of a settler, also equipped with properly designed baffles, and the effluent upper liquid phase discharges from near the top of the settler into the lower portion of an hydrolysis tower packed with inert material such as broken tile, etc. An exit from the bottom of the settler carries lower phase catalytic material back to the lower portion of the contactor. Water, preferably acidified, enters the tower at a point near the top but well below the exit for the organic effluent which discharges into the bottom of a second tower to be similarly counter-currently washed with sodium carbonate solution. A third tower counter-currently washes organic effluent from the second with water. The organic fluid from the third tower is carefully separated from water, preferably dried by passage through a tower filled with granular adsorbent such as activated alumina or bauxite, and is continuously charged to a fractionation unit designed for operation under reduced pressure when necessary. Recovered mercaptans and unsaturates then may be recycled to the process. An exit at the bottom of the towers takes off spent aqueous solutions and that from the hydrolysis tower may be processed to recover anhydrous catalyst when feasible.

Contactors or mixers followed by settlers, similar to those used for carrying out the reaction, may be used for hydrolysis and washing instead of towers with counter-current contact. In most cases fractionation under reduced pressure is required to separate products without decomposition. If desired, fractionation may be carried out batch-wise on charges of dry product from storage. Spent catalyst or catalytic complex withdrawn from the process is preferably hydrolyzed and washed separately, if it is desired to recover the minor quantity of products therefrom, since the products from this phase are predominantly heavier than the products of the main reactions, and contain polymers, complex compounds resulting from condensations of polymers, etc. It is preferred to carry out the hydrolysis of the spent catalytic phase in a contactor designed for adequate internal cooling and vigorous mixing rather than in a tower. The use of wetting agents in the hydrolysis of the upper liquid layer ordinarily is not necessary to obtain full yields, but it may be advantageous in some cases in the hydrolysis of the lower catalytic phase. The aqueous solution from this hydrolysis may be processed to produce catalyst.

Continuous operation is accomplished in the vapor phase by the use of conventional catalytic methods with a granular catalyst composed of a solid adsorbent impregnated with a Friedel-Crafts type catalyst, or of a flux containing a Friedel-Crafts type catalyst. With two catalyst chambers and beds, one catalyst can be regenerated while the other is in active use. Regeneration can be accomplished by heating the spent catalyst in a stream of inert gas such as nitrogen or carbon dioxide, hydrogen or hydrogen-containing gases, oxygen or oxygen-containing gases, hydrogen halides, steam, or mixtures of the latter four with inert gases. After dehydration by heating when necessary, the catalyst is reimpregnated with anhydrous catalyst as may be required. "Fluid" catalysis with solid catalysts in a finely-divided state and preferably mixed with finely-divided solid adsorbents is also a means of continuous operation in the vapor phase. The use of small amounts of hydrogen halide as catalyst promoter is especially advantageous in this method of operation.

In order to demonstrate the invention, ethyl mercaptan and diisobutylene boiling within the range of 100 to 102° C. were reacted in a mol ratio of 1 to 1 in the presence of anhydrous aluminum chloride. Three unit charges of the reactants were charged to the reaction vessel and the contact time for each unit charge was fifteen minutes with continuous agitation by means of an electrically operated stirrer. The mol ratio of each reactant to aluminum chloride in the first unit charged was 3 to 1 and the same quantity of each reactant was charged in each unit. The reaction was carried out at a temperature of approximately 20° C. under atmospheric pressure. Reaction products separated from the catalyst phase at the end of each unit charge operation were combined and the composite, upper-layer product was hydrolyzed with 5% hydrochloric acid. After withdrawal of the upper layer following processing of the third unit charge, the catalyst phase was separately hydrolyzed in the contactor, and the organic product therefrom was separated from the aqueous phase after discharge of the entire mixture from the contactor. The upper layer composite product, exclusive of product from the catalyst phase was distilled under reduced pressure and there was obtained a yield of 83% by weight, based on the distillation charge, of thioethers (octyl ethyl sulfides) having a boiling range of 192 to 204° C. The catalyst was still active after processing the third unit charge as shown by the fact that the mercaptan sulfur content of the third upper layer product was as low as that in the second.

The invention is applicable to the preparation of thioethers from other alkyl mercaptans such as propyl, isopropyl, butyl, isobutyl, amyl mercaptans and from aromatic mercaptans such as thiophenol, as well as from other olefins, such as ethylene, propylene, butylene, olefins having a tertiary carbon atom such as isobutylene and triisobutylene, and from other unsaturated hydrocarbons such as butadiene, acetylene and cyclohexene. When using butenes and higher boiling unsaturated hydrocarbons in the synthesis, the process proceeds satisfactorily at atmospheric temperature. When using lower boiling olefins, such as ethylene and propylene, reaction proceeds more satisfactorily at temperatures of approximately 50° to 100° C.

Although I prefer to use approximately equal mol ratios of the mercaptan and unsaturated hydrocarbon in the synthesis of thioethers, it should be understood that the ratio may vary somewhat without departing from the invention, although in general the mol ratio of mercaptans to olefins should be less than 2 to 1 and greater than 1 to 2.

Where it is desired to prepare saturated hydrocarbons and organic disulfides, I prefer to use mol ratios of mercaptans to olefins of at least 2 to 1.

I have found that in the production of thioethers by means of successive unit charges of reactants excellent results are obtained when the ratio of catalyst to reactants is within the range of approximately 1 to 6 mols of unsaturated hydrocarbon per unit charge to one mol of catalyst. For production of disulfides and saturated hydrocarbons with this type of operation a higher ratio of catalyst to reactants of approximately ⅓ to 3 mols of catalyst to one mol of mercaptan is preferred.

It is claimed:

The method of preparing organic sulfides having two different hydrocarbon groups linked to sulfur comprising contacting mercaptans and unsaturated hydrocarbons in a ratio of two mols of mercaptans to 1–4 mols of unsaturated hydrocarbons with a Friedel-Crafts catalyst at a temperature of about 100°–200° C., for a period of time sufficient to cause the mercaptans and unsaturated hydrocarbons to react, said Friedel-Crafts catalyst being the principal and essential catalytic constituent of the reaction mixture, the hydrocarbon group in said mercaptan differing from the unsaturated hydrocarbon reacted therewith.

RICHMOND T. BELL.

REFERENCES CITED

The following references are of record in the file of this patent:

UNITED STATES PATENTS

| Number | Name | Date |
|---|---|---|
| 2,051,807 | Allen | Aug. 25, 1936 |
| 2,352,435 | Hoeffelman et al. | June 27, 1944 |
| 2,366,453 | Meadow | Jan. 2, 1945 |

FOREIGN PATENTS

| Number | Country | Date |
|---|---|---|
| 427,903 | Great Britain | May 2, 1935 |
| 532,676 | Great Britain | Jan. 29, 1941 |